United States Patent [19]

Patterson

[11] Patent Number: 4,928,427
[45] Date of Patent: May 29, 1990

[54] IRRIGATION SYSTEM

[76] Inventor: James A. Patterson, 2074 20th St., Sarasota, Fla. 34234

[21] Appl. No.: 393,539

[22] Filed: Aug. 14, 1989

[51] Int. Cl.$^5$ .................. A01G 25/06; E02B 13/00
[52] U.S. Cl. ..................................... 47/58; 47/81; 47/48.5; 405/44
[58] Field of Search ............ 47/79, 48.5, 80, 81, 47/58; 405/43–45

[56] References Cited

U.S. PATENT DOCUMENTS

| | | | |
|---|---|---|---|
| 965,895 | 8/1910 | Hardin | 405/45 |
| 3,302,408 | 2/1967 | Schmid | 405/44 |
| 3,757,469 | 9/1973 | Smith et al. | 47/48.5 |
| 4,117,632 | 10/1978 | Pearce | 47/81 |
| 4,235,561 | 11/1980 | Peterson | 47/48.5 |
| 4,805,343 | 2/1989 | Patterson et al. | 47/79 |

FOREIGN PATENT DOCUMENTS 2267698  11/1975  France ................. 47/48.5

Primary Examiner—Danton D. DeMille
Attorney, Agent, or Firm—Charles J. Prescott; Raymond H. Quist

[57] ABSTRACT

A hollow, cellulose acetate fiber having a wall permeable to water is formed into a coil of constant dimensions. The coil is placed at the root level of the plants to be irrigated. Where the plants are spaced at intervals (as opposed to being immediately adjacent) a number of coil turns are positioned at the plant location and the coil stretched out between plant locations. In this manner, irrigation is concentrated at the plant and minimized in the intervening distance. Consequently, even though the coil is of constant dimensions and porosity, the quantity of water dispensed can be varied as desired. Similarly the spacing between parallel coils can be varied. This spacing variation is desirable where the pressure of the water varies because of height changes, on a slope for example. The subterraneon watering by coil has an additional beneficial effect because the roots of the plants tend to concentrate within the turns of the coil so as to become anchored thereto. This minimizes errosion of the soil around the plants whether caused by water or wind.

23 Claims, 2 Drawing Sheets

IRRIGATION SYSTEM

BACKGROUND OF THE INVENTION

1. Field of the Invention

This invention relates generally to an irrigation system, and more particularly to a subterranean irrigation system for controlled irrigation and fertilizing of large areas of plants.

2. Description of Related Art

Irrigation is commonly used in the nurturing of plants outdoors to supplement precipitation. Most irrigations systems supply water at the soil surface although subterranean irrigation systems have been proposed. Fertilization is also most commonly performed by application of fertilizer at the soil surface.

U.S. Pat. No. 4,224,048, Pendergast, entitled: "Osmotic Fertilizer Product and Fertilization Method", discloses a tubular membrane having fertilizer packed therein. This tube is buried in the vicinity of the roots of plants to be fertilized. During surface watering, water passes through the tube wall by osmosis. As the soil dries, dissolved fertilizer leaves the tube and fertilizes the plants.

U.S. Pat. No. 4,235,561, Peterson, entitled: "Subterranean Irrigation Means and System", discloses the use of porous or semipermeable pipe arranged in a network to water and fertilize plants over a large area.

In carrying out the present invention we prefer to use flexible, hollow, semipermeable, cellulose acetate fibers formed into coils of constant dimensions.

U.S. Pat. Nos. 3,423,491, McLain et al.; 3,873,653, Meinecke et al.; and 4,035,459, Kesting all describe the fabrication of such fibers.

SUMMARY OF THE INVENTION

A coil of hollow, semipermeable fibers is buried in the soil at the depth of the roots of the plants to be grown. A coil is disposed in the soil so that the axis of the coil is parallel to the surface of the ground. The surface of the ground may be level or on a slope up to just below the avalanche angle for the type of soil, i.e. 50° to 80°. A plurality of such coils may be arranged parallel to each other and be interconnected with the network connected to a water supply. The water may have ammonia added as a nutrient. Where spaced, individual plants are to be watered, a plurality of coils may be disposed at each plant location—the number of coils being dependent upon the quantity of water required by the plant. Between plants the coil is extended. Where even distribution of water is desired on a sloped surface, parallel coils are disposed at right angles to the slope with the spacing between the parallel coils being smaller at the top of the slope where the head of water is the least, and gradually increasing down the slope as the head increases. The roots of plants grown using these coils tend to concentrate in the cylindrical core defined by the coils and are anchored by the coil so as to hold the soil against erosion.

It is therefore an object of this invention to provide an irrigation system which concentrates watering at plant locations and minimizes watering between plants.

It is also an object of this invention to provide an irrigation system wherein the roots of the plants become anchored in the coils of the system to that the surrounding soil resists erosive forces.

In accordance with these and other objects, which will become apparent hereafter, the instant invention will now be described with reference to the accompanying drawings.

DETAILED DESCRIPTION OF THE INVENTION

Figure 1:
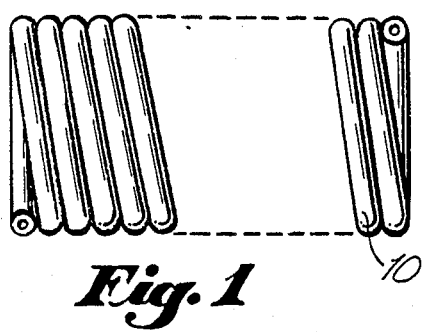
FIG. 1 is an elevation of a coil in accordance with the invention.
Figure 2:
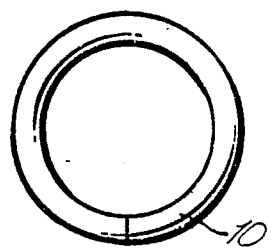
FIG. 2 is an end view of the coil of FIG. 1.

Referring now to FIGS. 1 and 2, coil 10 is formed of a flexible hollow fiber. The wall of the fiber is formed of a semipermeable material such as cellulose acetate so that water will pass through the wall. Each turn of the coil has the same diameter and the fiber similarly has constant internal and external diameters so that a coil of constant dimensions is formed. The coil may be formed from a previously formed hollow fiber by wrapping it around a mandrel heated sufficiently to cause the fiber to become plastic. When it is subsequently cooled, the turns are set. Alternatively, the fiber may be wrapped around a cool mandrel as the fiber is formed by extrusion.

Figure 3:
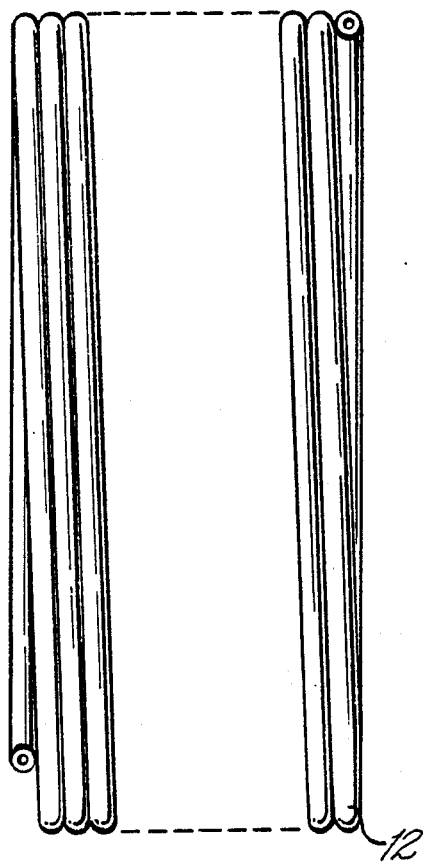
FIG. 3 is an elevation of another coil in accordance with the invention.
Figure 4:
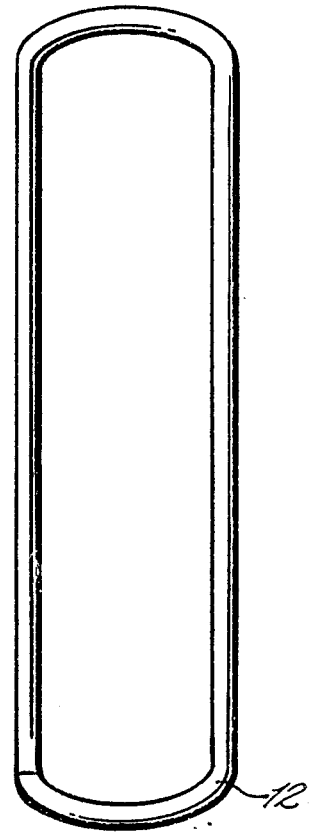
FIG. 4 is an end view of the coil of FIG. 3.

Turning next to FIGS. 3 and 4, coil 12 is shown which has noncircular turns of generally rectangular configuration, but also of constant dimensions. Coil 12 is formed similarly to coil 10 although using a mandrel having a different cross-section. It is contemplated that other noncircular coils may also be employed.

As is known in the art, at a particular pressure a unit length of a particular fiber will pass through its wall a certain volume of water in a unit time. With the fiber formed in a coil, when the length of the fiber in one turn is determined, along with the number of turns of coil in a unit length of coil, the maximum volume of water per unit length of coil can be calculated. This is when each turn is adjacent to the turns on either side. When the coil is extended so that it has fewer turns per unit length, the volume of water dispensed per unit length goes down. Similar reasoning is applied to determine the desired distance between parallel coils to obtain suitable irrigation.

The coils of the present invention can also be used in the opposite operation—extracting water from soil or other material.

Figure 5:
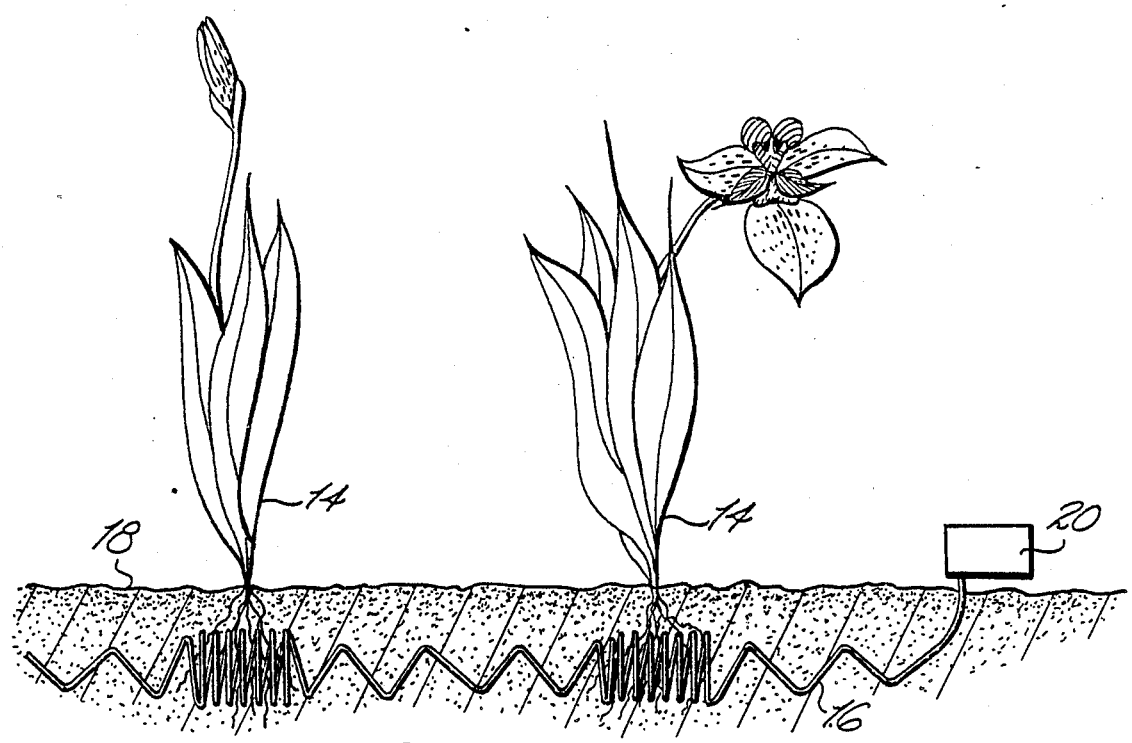
FIG. 5 shows schematically a cross-sectional view of a coil being used in accordance with the invention.

FIG. 5 represents schematically two plants 14 which are growing in the soil. Coil 16 is a coil such as coils 10 or 12, discussed above, which has been placed below soil surface 18 prior to planting the seeds for plants 14. Coil 16 is connected to a supply of water 20. As shown, a plurality of coil turns have been positioned at the location of the roots of the plants, while in the intervening soil between plants 14, the coils have been stretched. In this manner, watering will be concentrated at the point where watering is desired, and watering will be minimized in those areas where watering is not needed. Moreover, as discussed in U.S. Pat. No. 4,805,343 water will be dispensed through the wall of coil 16 primarily in response to plant needs. This minimizes consumption of water. Water is also conserved because evaporation to the above surface air is minimized. Coil 16 is placed so that the axis of the coil is generally parallel to the surface of the soil and at a depth where the roots will grow. It has been found that the roots tend to concentrate within the turns of the coil and so become interlocked with the coil. In addition to water, a fertilizer such as ammonia can be dispensed through the coil.

Figures 6, 7:
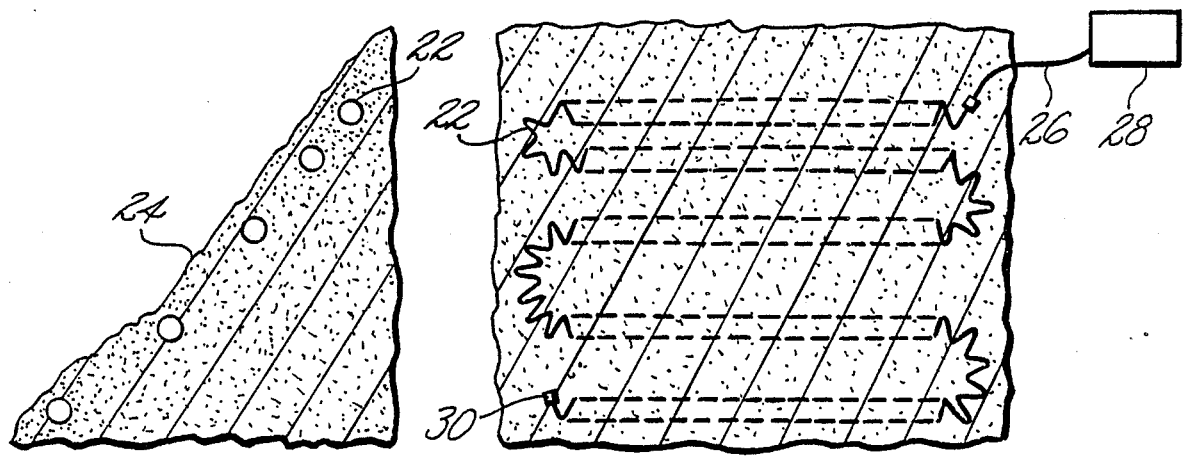
FIG. 6 shows schematically a cross-sectional view of a coil being used in accordance with the invention.
FIG. 7 is an elevation of the coil of FIG. 6.

The above mentioned interlocking of the plant roots with the coil makes feasible reclamation of land otherwise subject to the effects of errosion. Such land is found where strip mining has been carried out and in cut and fill operations associated with the building of roads or the like. Referring to FIGS. 6 and 7, coil 22 is buried in the soil on slope 24. Coil 22 is connected by supply line 26 to a source of water 28. As shown, coil 22 extends across slope 24 generally parallel to the surface with the coil rows on the upper portion of the slope spaced closer together than the coil rows on the lower portion. This arrangement provides an even distribution of water as the head or pressure is higher on the lower portions of the slope than on the upper portions. The end of coil 22 is closed by closure 30.

The coils of this invention are also useful in growing ground cover such as grass in desert or arid areas. For this purpose, where the ground is relatively level, an even distribution of the coils is used. The spacing between turns of the coils is directly proportional to the amount of water which will be dispensed. The head or pressure also can be varied to change flow rate.

What is claimed:

1. A method of irrigating soil below the surface comprising the steps of:
   placing a coil having a coil axis in the soil with said coil axis substantially parallel to the soil surface;
   said coil having constant overall dimensions and formed of a flexible and pliable, hollow tubular fiber;
   said fiber having a constant diameter and having a wall permeable to water;
   introducing water into said coil.

2. A method for preventing the erosion of soil having a surface by wind or water comprising the steps of:
   selecting a plant species to be planted;
   preparing the soil by burying constant overall dimension coils formed of a flexible and pliable, hollow, tubular fiber at the root of said plant species;
   said coil, as formed, having a fixed number of turns per unit length;
   said fiber having a constant diameter and having semipermeable properties, whereby said coil may be positioned in soil with said number of turns per unit length varied as desired to vary dispensed water quantity;
   said coils having a coil axis and said coil axes being disposed substantially parallel to said soil surface and substantially parallel to each other; and
   connecting said coils to a source of water.

3. A method for preventing the erosion of soil in accordance with claim 2 wherein:
   said soil surface is sloping; and
   said coils are spaced closer on upper surface portions and wider on lower surface portions.

4. In a subterranean irrigation system where water is dispensed through the wall of a subsurface conduit, an improved conduit comprising:
   a coil having constant overall dimensions formed of a flexible and pliable, hollow, tubular fiber;
   said coil, as formed, having a fixed number of turns per unit length;
   said fiber having a constant diameter and having semipermeable properties, whereby said coil may be positioned in soil with said number of turns per unit length varied as desired to vary dispensed water quantity.

5. An improved conduit in accordance with claim 4 wherein:
   said coil is fabricated of cellulose acetate.

6. An improved conduit in accordance with claim 4 wherein:
   said coil has circular turns.

7. An improved conduit in accordance with claim 4 wherein:
   said coil has substantially rectangular turns.

8. An improved conduit in accordance with claim 4 wherein:
   said coil has noncircular turns.

9. A system for anchoring the roots of plants in soil below the surface thereof comprising:
   a constant overall dimension coil formed of a flexible and pliable, hollow, tubular fiber;
   said coil, as formed, having a uniform number of turns per unit length;
   said fiber having a constant diameter and having a wall permeable to water, whereby said coil may be positioned in soil with said number of turns varied as desired;
   said coil being disposed in soil at substantially root depth of the plants to be anchored;
   said coil having a coil axis;
   said coil axis being substantially parallel to the soil surface.

10. A system for anchoring the roots of plant in soil in accordance with claim 9 further including:
    a supply of water connected to said coil.

11. A system for anchoring the roots of plant in soil in accordance with claim 9 wherein:
    said coil has turns which are evenly spaced.

12. A system for anchoring the roots of plant in soil in accordance with claim 9 wherein:
    said coil has turns unevenly spaced.

13. A system for anchoring the roots of plant in soil in accordance with claim 9 wherein:
    said coil is disposed in parallel rows.

14. A system for anchoring the roots of plant in soil in accordance with claim 9 wherein:
    said rows are evenly spaced.

15. A system for anchoring the roots of plant in soil in accordance with claim 9 wherein:
    said rows are unevenly spaced.

16. A system for anchoring the roots of plant in soil in accordance with claim 15 wherein:
    said rows are on sloping soil with each row at a substantially constant elevation and said rows are spaced closely on upper parts of said sloping soil and said rows are spaced wider on lower parts of said sloping soil.

17. An irrigation system for plants in soil comprising:
    a constant overall dimension coil formed of a flexible and pliable, hollow, tubular fiber;
    said coil as formed having a uniform number of turns per unit length;
    said fiber having a constant diameter and having semipermeable properties;
    said coil disposed in the soil with said number of turns per unit length varied as desired to vary dispensed water quantity at substantially root depth of the plants to be irrigated;

said coil having a coil axis;

said coil axis being substantially parallel to the soil surface; and a supply of water connected to said coil.

18. An irrigation system in accordance with claim 17 wherein:

said coil has turns which are evenly spaced.

19. An irrigation system in accordance with claim 17 wherein:

said coil has turns unevenly spaced.

20. An irrigation system in accordance with claim 17 wherein:

said coil is disposed in parallel rows.

21. An irrigation system in accordance with claim 20 wherein:

said rows are evenly spaced.

22. An irrigation system in accordance with claim 20 wherein:

said rows are unevenly spaced.

23. An irrigation system in accordance with claim 22 wherein:

said rows are on sloping soil with each row at a substantially constant elevation and said rows are spaced closely on upper parts of said sloping soil and said rows are spaced wider on lower parts of said sloping soil.

* * * * *